Figure 4:
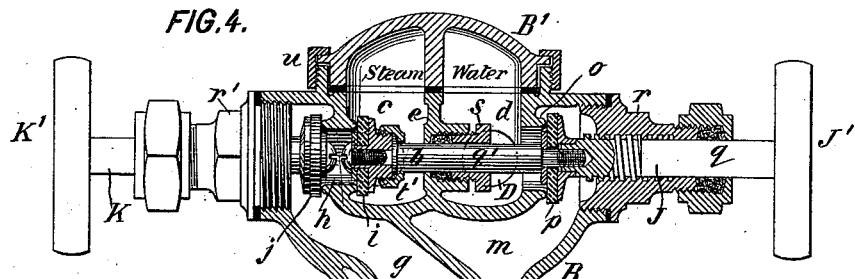

(No Model.) 3 Sheets—Sheet 1.
T. C. BEAUMONT.
HOT WATER BATH FIXTURE.
No. 555,033. Patented Feb. 18, 1896.
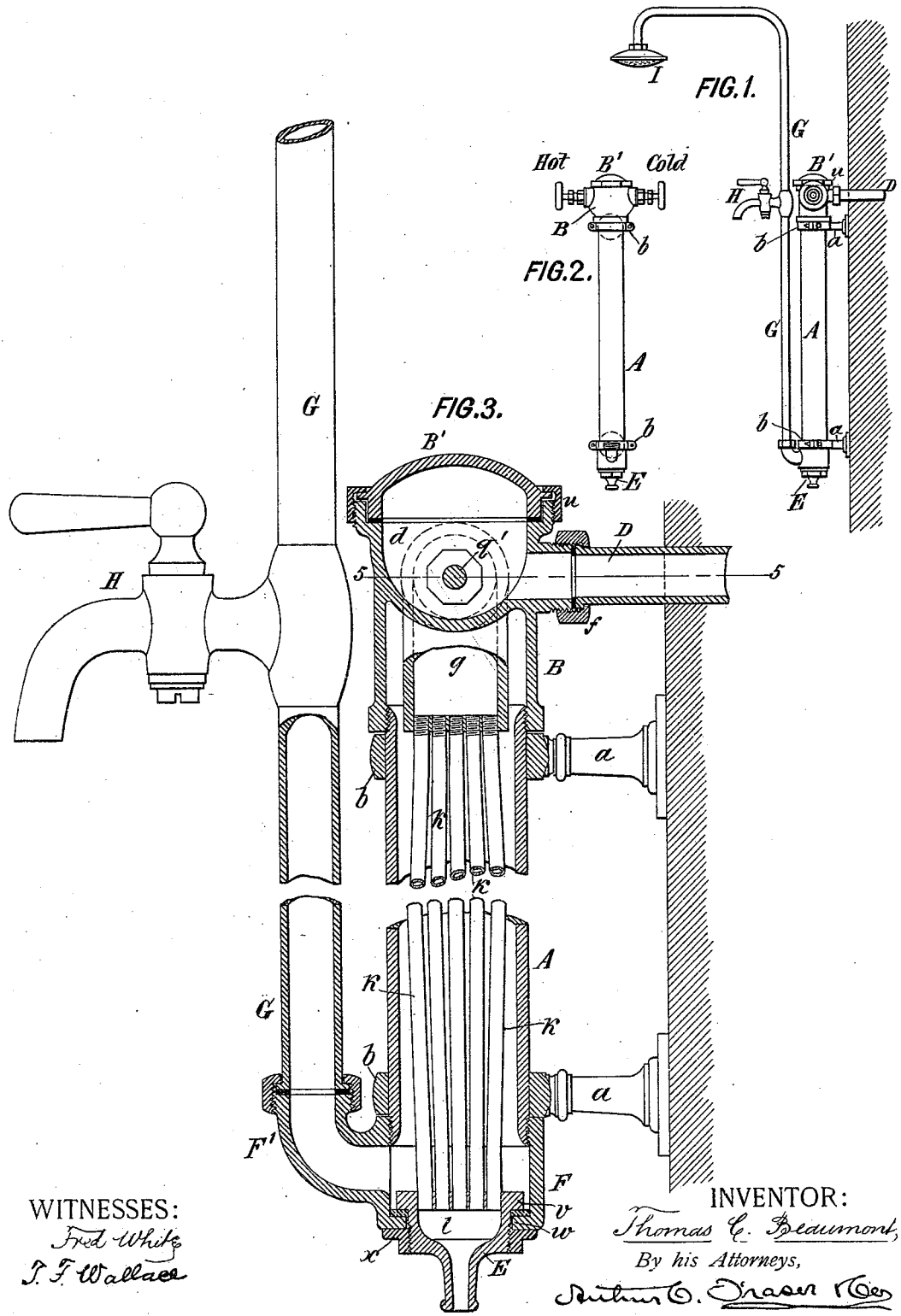
WITNESSES:
Fred White
T. F. Wallace
INVENTOR:
Thomas C. Beaumont,
By his Attorneys, (No Model.) 3 Sheets—Sheet 2.
T. C. BEAUMONT.
HOT WATER BATH FIXTURE.

No. 555,033. Patented Feb. 18, 1896.

WITNESSES:
Theodore Becker
Fred White

INVENTOR:
Thomas C. Beaumont,
By his Attorneys,
Arthur C. Fraser & Co.

(No Model.) 3 Sheets—Sheet 3.

T. C. BEAUMONT.
HOT WATER BATH FIXTURE.

No. 555,033. Patented Feb. 18, 1896.

WITNESSES:
Theodore Becker
Fred White

INVENTOR:
Thomas C. Beaumont,
By his Attorneys,
Arthur C. Fraser & Co

UNITED STATES PATENT OFFICE.

THOMAS C. BEAUMONT, OF NEW YORK, N. Y., ASSIGNOR TO THE HENRY HUBER COMPANY, OF SAME PLACE.

HOT-WATER-BATH FIXTURE.

SPECIFICATION forming part of Letters Patent No. 555,033, dated February 18, 1896.

Application filed March 10, 1894. Serial No. 503,083. (No model.)

*To all whom it may concern:*

Be it known that I, THOMAS C. BEAUMONT, a citizen of the United States, residing in the city, county, and State of New York, have invented certain new and useful Improvements in Hot-Water-Bath Fixtures, of which the following is a specification.

This invention relates to means for heating water for baths, showers and other purposes where water is occasionally required to be heated, the invention being especially designed for those occasions where it is desirable to draw at will either hot or cold water through the same pipe. The water in flowing to the faucet, shower, or other outlet passes through a water-heating passage or pipe, where it is exposed to the heat of steam contained in small pipes extended through said water-pipe and constituting a steam-passage, the steam being condensed by giving up its heat to the water in its flow through said passage. Hence if the steam is turned on along with the water the water issues hot, but if the steam is not turned on the water flows cold. In such heating device it is important to provide means for preventing turning on steam without also turning on the water, as by so doing steam would blow into the waste-pipes and might scald the occupants of the building or have other disastrous results.

The object of the present invention is to provide means for controlling the admission of water and steam, to the end that the steam cannot be turned on without also turning on water, while the flow of steam may be regulated independently of the flow of water in order to heat the water to a greater or less extent, and in order also that water may be turned on to draw cold water when desired.

To these ends the improved apparatus has a compound valve for controlling the admission of water or steam to the water-heating and steam passages, consisting of a shell having steam and water passages through it, a pair of valves connected together and adapted to close the steam and water passages, respectively, and an independent valve adapted to close the steam-passage only, so that steam can flow only when both valves are open, and cannot be turned on without thereby opening the water-valve.

Having thus given a general idea of my invention, I will proceed to describe the same with reference to the accompanying drawings, wherein—

Figure 6:
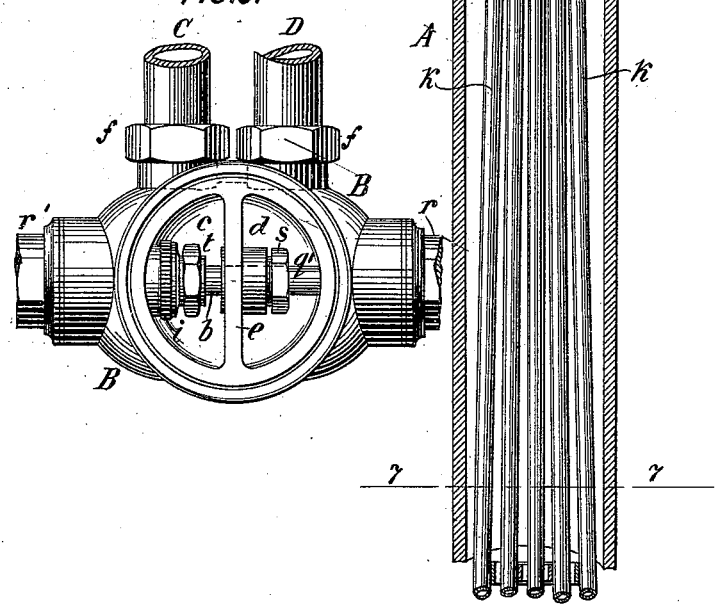
Figure 7:
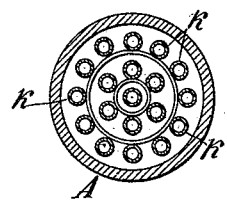
Figure 5:
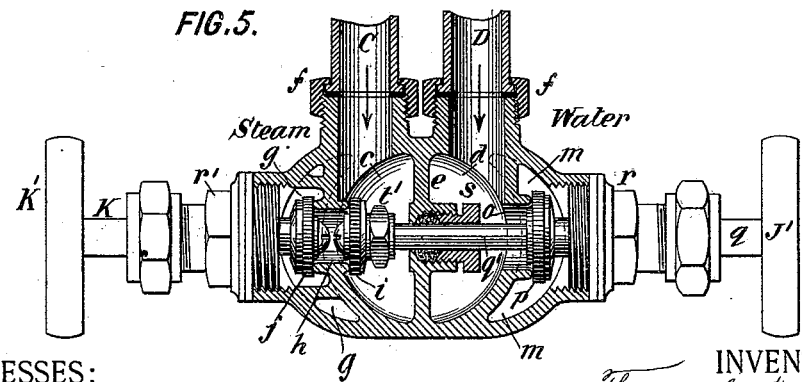
Figure 8:
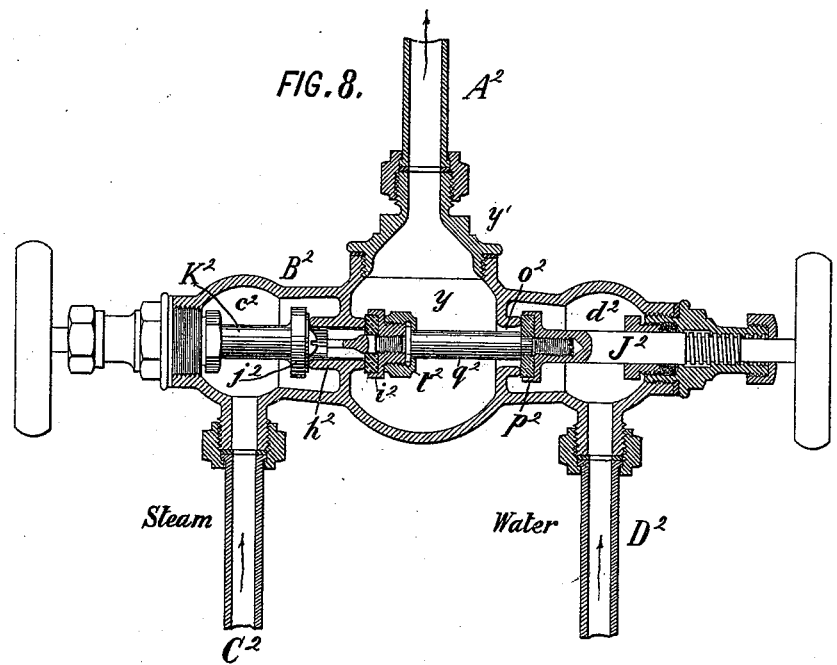

Figure 1 is a side elevation of my improved bath-fixture as a whole. Fig. 2 is a front elevation thereof, the water-delivery pipe being omitted. These views are on a small scale. Fig. 3 is a side view on a larger scale in vertical section. Fig. 4 is a front view of the upper part of the apparatus in vertical mid-section. Fig. 5 is a horizontal section through the valve-shell in the plane of the line 5 5 in Fig. 3. Fig. 6 is a plan of the valve-shell with its top removed. Fig. 7 is a horizontal section of the water heating and steam passages. Fig. 8 is a sectional view of a modification.

Let A designate a water-heating pipe or passage arranged preferably as an upright stand-pipe, being shown as supported by pedestals $a$ $a$ fastened to the wall, and formed with divided collars $b$ $b$ embracing the pipe. Screwed to the top of this pipe is the valve-shell B of the compound valve. This valve is formed with a steam-inlet chamber $c$ and a water-inlet chamber $d$, separated by a suitable partition $e$. Steam is admitted to the steam-inlet chamber through a steam-pipe C coupled or joined to the valve-shell in any suitable way at the back, and water is admitted to the water-chamber through a pipe D also preferably at the back, these pipes C and D being preferably joined to the valve-shell by unions or couplings $f f$. The valve-shell is formed with a steam-outlet passage $g$ which communicates with the chamber $c$ through an outlet-seat $h$ having seating-faces on opposite sides, against which two valve-disks $i$ and $j$ are arranged to seat themselves. The steam-outlet passage $g$ extends downwardly and communicates with a series of thin metal tubes $k$ $k$, which extend down through the stand-pipe A, as shown in Figs. 3 and 4 and in cross-section in Fig. 7. Consequently when both valve-disks $j$ and $i$ are unseated steam may flow through from the steam-chamber $c$ into the passage $g$ and through the tubes $k$. In its passage through these tubes the steam gives up its heat to the water in the stand-pipe A, which fills the space around the tubes, so that the steam is condensed, and the resulting water of condensation passes from the lower ends of the tubes into the chamber $l$ of a discharge-nozzle E (shown best in Fig. 3) and drips or flows out of this nozzle, being conducted into the waste-pipes. The shell B is also constructed with a water-passage $m$ which communicates with the chamber $d$ by an outlet seat or opening $o$, having a seating-face against which a valve-disk $p$ may seat itself. When this valve-disk is open the water flows through the chamber $d$, through the seat $o$ and passage $m$ into the stand-pipe A, and flows down through this pipe to the bottom end thereof, from which it flows into a socket-piece F fastened therein and having a branch F', to which is coupled an ascending water-pipe G, which extends up to a faucet H, and also higher up to a shower or sprinkler I, Fig. 1. The water while flowing down through the pipe A is heated from the pipes $k$ if the steam be turned on, but otherwise is not heated, and after flowing through the pipe A the water ascends through the branch F' and pipe G and flows out through the faucet H if it be open, or otherwise ascends to the shower I; or any other outlet may be provided in lieu of the faucet H or shower I.

The valves $i$ and $p$, which are shown as disk-valves, are connected together for simultaneous operation, in order that the steam-outlet port $h$ shall always be closed whenever the water-outlet port $o$ is closed. The preferable construction is to mount both valves on one valve-stem J, which is constructed to screw out and in after the manner common in the construction of compression-faucets, being turned by a handle or knob J'. For convenience in construction the stem is made in two pieces, the outer piece, $q$, being formed with the screw-threads by which it is propelled out or in by engaging female threads in the valve-cap $r$, which is of usual construction. The other section, $q'$, is somewhat smaller and screws into the section $q$, thereby clamping the valve-disk $p$ between the two sections, so as to hold it securely in place. This section $q'$ passes through the partition $e$, which separates the steam and water chambers, and in order to prevent leakage of steam around the stem into the water-chamber a stuffing-box is provided in the partition, having a gland $s$ of usual construction screwing into it. The valve-disk $i$ is carried by the end of the section $q'$ of the stem, being preferably swiveled to it, so that the stem may turn without rotating the valve, for which purpose the stem is formed with a projecting head $t$ on its end, which is engaged by a coupling-nut $t'$ screwing on the threaded boss on the valve-disk.

The steam-valve $j$ is carried by a stem K, the construction of which is the same as that of the section $q$ of the stem J. It screws out and in in a valve-cap $r'$, being turned by a handle K'. The purpose of the valve $j$ is to regulate the flow of steam when hot water is being drawn and to keep the steam shut off when it is desired to draw cold water.

In order to have ready access to the chambers $c$ and $d$, the valve-shell B is provided with a removable top or cover B', which is fastened on in any suitable way, preferably by screwing a union nut or coupling-ring $u$ down against it, the nut engaging threads fromed on a flange projecting up from the shell and inclosing the base of the cover. Within this flange a packing-washer is introduced between the cover and the top of the shell to make a tight joint. The cover is shown removed in Fig. 6, which illustrates the accessibility of the valve $i$ in the chamber $c$ and of the gland $s$ to the stuffing-box in the chamber $d$. In putting the parts together the stem-section $q$ is introduced from the right with the valve $p$, and the stem-section $q'$ is introduced from the left before the cap $r'$ and valve $j$ are put in place. The coupling-nut $t'$ is first passed over the section $q'$, the latter thrust through the partition $e$, and the gland $s$ inserted from above and the stem passed through it and then screwed into the stem-section $q$. The valve $i$ is then lowered into place from above and the nut $t'$ screwed onto it. The packing is then introduced into the packing-box and the gland $s$ screwed in, after which the cover B' may be applied. The valve-disk $j$ is applied to the stem K after the latter is put through the cap $r'$, and the latter is then screwed into the shell.

When it is desired to draw cold water, the valve-handle J is turned to open the valve-disk $p$, the valve $j$ being closed to prevent escape of steam. To draw hot water the handle K' is turned to open the valve-disk $j$ and permit steam to flow into the tubes $k$, the quantity of steam admitted being determined by the adjustment of this valve. Whenever the water is shut off the steam is also shut off, since the valve $i$ seats simultaneously with the valve $p$. Thus it is impossible to draw steam through the apparatus without also drawing water to condense the steam, so that all danger of scalding or other injury from the hot steam is avoided.

The apparatus is very easily controlled, the flow of water being determined by the adjustment of the handle J', and the temperature of the outflowing water is controlled by the adjustment of the handle K'.

I prefer to construct the water-pipe A and steam-tubes $k$ of the same metal, in order to secure substantially the same degree of expansion and contraction, in which case the upper portion or body of the nozzle E may be constructed, as shown in Fig. 3, with a flange $v$ overlying the bottom $w$ of the chamber F with a packing-washer between to make a tight joint, the flange being drawn tightly down against this washer by a nut $x$ screwed on the exterior of the nozzle.

My invention may be modified in many ways without departing from its essential features. I have shown that construction of valves which is best adapted for making tight joints for both steam and water—namely, a disk-valve having a soft packing material upon its face and seating against a flat annular seat; but it will be understood that any other known or suitable construction of valves and valve-seats may be substituted without departing from my invention. Neither is it essential that the operative connection between the valves $i$ and $p$ for insuring their simultaneous opening or closing shall consist of a single stem on which they are both mounted, as other mechanical connections might be substituted to like effect. It will be noted that the steam-passage is intercepted or controlled by two successive valves—namely, the valve $i$, which moves with the water-controlling valve, and the valve $j$, which independently controls the flow of steam—so that it is necessary that both these valves shall be opened in order that any steam may flow.

I regard the group of small steam-pipes $k$ as constituting together essentially a single steam-passage. Any other construction by means of which a steam-passage is afforded with thin or conductive walls separating it from the water-passage for transferring the heat from the steam to the water may be substituted for the construction shown as an equivalent thereof.

Fig. 8 shows a modification of the compound valve adapted for use in cases where the steam is commingled with the water to be heated, or where hot water is commingled with cold water. In the example shown the water and steam are admitted from beneath, and the outlet or discharge pipe leads from the middle of the valve-shell and extends upwardly. The valve-shell $B^2$ is constructed with three internal chambers—namely, a steam-chamber $c^2$, a cold-water chamber $d^2$, and a hot-water or commingling chamber $y$ between them. Steam or hot water is admitted at $C^2$ into the chamber $c^2$, and cold water is admitted by the pipe $D^2$ into the chamber $d^2$. A valve-stem $J^2$ operated by the handle at the right carries the disk-valve $p^2$, which closes against the seat $o^2$ in the partition between the cold-water chamber and the commingling-chamber. The extension $q^2$ of the stem carries the disk-valve $i^2$, which is connected to it through the medium of a coupling-nut $t^2$. The valve $i^2$ closes against one side of the seat or passage $h^2$, affording communication between the steam-chamber and the commingling-chamber. Against the other side of this seat or passage there closes a valve-disk $j^2$ mounted on the stem $K^2$, operated by the handle at the left. From the commingling-chamber $y$ the water flows out through the pipe $A^2$, which is coupled to the removable-cap $y'$ of this chamber.

It will be understood at once that this construction is essentially the same as that first described, since the stem $J^2$ with its valves $p^2$ and $i^2$ is essentially the same as the stem $J$ with its valves $p$ and $i$. The stem $K^2$ with its valve $j^2$ is the same as the stem $K$ with the valve $j$, and the steam-passage is controlled by the two valves $j^2$ and $i^2$, just as in the previous construction it is controlled by the two valves $j$ and $i$. It follows that steam cannot enter the outlet-pipe $A^2$ unless water to be heated is flowing through that pipe, since the valve $i^2$ is opened only when the water-valve $p^2$ is opened. This particular construction is applicable where the steam is unmixed with oil or other matter which would be objectionable in commingling with the water. It is also adapted for use where instead of steam hot water is employed to be commingled with cold water. As applied in the latter case, the compound valve has the same advantage as with steam—namely, that it prevents the admission of the hot fluid except in company with the cold fluid.

I claim as my invention the following-defined novel features, substantially as hereinbefore specified, namely:

1. The combination with a water-outlet passage, of a compound valve for controlling the admission of water and steam thereto, consisting of a shell having two distinct inlet-passages for water and steam, a pair of valves connected for simultaneous operation and adapted to close respectively the steam and water passages, and an independent valve adapted to close the steam-passage, whereby steam can flow only when both valves are open, and cannot be turned on without also turning on a stream of water to be heated.

2. The combination with a water-outlet passage, of a compound valve for controlling the admission of water and steam, consisting of a shell having two distinct steam and water inlet chambers and outlet-seats therefrom, a valve-stem and two valves carried thereby, the one closing the steam-outlet seat and the other the water-outlet seat, and an independent stem carrying a valve closing the steam-outlet seat, whereby the former stem controls the flow of water, and both control the flow of steam, so that the steam cannot be turned on without also turning on a stream of water to be heated.

3. The combination with a water-outlet passage A, of a valve-shell B formed with two distinct steam and water inlet chambers $c$ and $d$, and outlet-seats $h$ and $o$ therefrom, valves $i$ and $p$ closing against said seats respectively, and connected together for simultaneous operation, and an independently-operating valve $j$ closing against said steam-outlet seat.

4. The combination with a water-outlet passage A, of a valve-shell B formed with two distinct steam and water inlet chambers $c$ and $d$, and outlet-seats $h$ and $o$ therefrom, valves $i$ and $p$ closing against said seats respectively, a valve-stem J carrying both said valves and having an operating-handle $J'$, and an independent valve $j$ closing against said steam-outlet seat, and a stem K and handle $K'$ for operating it.

5. The combination of a valve-shell B formed with steam and water inlet chambers c and d, separated by a partition e formed with a stuffing-box and having outlet-ports h and o, valves i and p, and a valve-stem J carrying said valves and passing through said stuffing-box, and with an independent valve j and its stem K.

6. The combination of a valve-shell B formed with steam and water inlet chambers c and d, and outlet-seats h and o therefrom, valves i and p closing against said seats respectively, a valve-stem J carrying both said valves, and formed in two sections screwed together, with a valve p between them, and a valve i swiveled on the section q' by means of a coupling-nut t' engaging the head t of this stem-section.

7. The combination of a valve-shell B formed with steam and water inlet chambers c and d, and outlet-seats h and o therefrom, and a cover B' closing the top of said shell to permit access to said chambers, valves i and p closing against said seats, stem J carrying said valves, valve j closing the steam-outlet seat, and stem K carrying said valve.

8. The combination with a water-heating passage A having a steam-passage k through it, of a compound valve comprising a valve-shell B formed with steam and water inlet chambers c and d, outlet-seats h and o therefrom, and outlet-passages g and m from said seats, two valves closing against said seats simultaneously with a stem for operating them, and an independent valve closing against the steam-outlet seat, with a stem for operating it.

9. The combination with a water-heating pipe A having steam-tubes k through it, of a shell F fastened on the outlet end of said pipe, a discharge-nozzle E to which the outlet ends of the steam-tubes are fastened, passing through said shell F and having a flange v packed against its bottom, and a nut x for tightening it against said packing.

In witness whereof I have hereunto signed my name in the presence of two subscribing witnesses.

THOMAS C. BEAUMONT.

Witnesses:
GEORGE H. FRASER,
CHARLES K. FRASER.